US012572877B2

(12) United States Patent
Ravikant et al.

(10) Patent No.: US 12,572,877 B2
(45) Date of Patent: Mar. 10, 2026

(54) SYSTEMS AND METHODS FOR END-TO-END MODULAR INTELLIGENCE

(71) Applicant: Walmart Apollo, LLC, Bentonville, AR (US)

(72) Inventors: Ravikant Ravikant, Bangalore (IN); Ravinder Kumar Tanwar, Bangalore (IN); Abhishek Sengupta, Bangalore (IN); Vijay Pandey, Bengaluru (IN); Ashwini Chandrashekharaiah, Doddakannelli (IN); Gowthamraman Subbaraman, Irving, TX (US); Ashwin Kannery, Vinayakanagar (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/789,210

(22) Filed: Jul. 30, 2024

(65) Prior Publication Data

US 2026/0037905 A1    Feb. 5, 2026

(51) Int. Cl.
 *G06Q 10/067*  (2023.01)
 *G06Q 10/0637*  (2023.01)
  (Continued)

(52) U.S. Cl.
 CPC ..... *G06Q 10/067* (2013.01); *G06Q 10/06375* (2013.01); *G06Q 10/087* (2013.01); *G06V 10/757* (2022.01)

(58) Field of Classification Search
 CPC .................................................. G06Q 10/067
 See application file for complete search history.

(56) References Cited

U.S. PATENT DOCUMENTS

2009/0059270 A1*  3/2009  Opalach ................. G06V 20/64
                                                        358/1.15
2015/0088703 A1*  3/2015  Yan ...................... G06Q 10/087
                                                        705/28
                        (Continued)

FOREIGN PATENT DOCUMENTS

WO     WO-2025143333 A1 *  7/2025  ............. G06Q 30/06

OTHER PUBLICATIONS

Laitala J, Ruotsalainen L. Computer Vision Based Planogram Compliance Evaluation. Applied Sciences. 2023; 13(18):10145. https://doi.org/10.3390/app131810145 (Year: 2023).*
                        (Continued)

*Primary Examiner* — Jonathan Ng
(74) *Attorney, Agent, or Firm* — Jones Day

(57)        ABSTRACT
Systems and methods for analyzing computer-readable image data to determine deviations from planogram data are disclosed. Image data of at least one physical display unit is obtained. The image data is annotated by an image processing engine to identify at least one item within the image data. Planogram data of a planogram corresponding to the at least one physical display unit is obtained and the at least one item within the image data is compared to an expected aspect of the at least one item within the planogram data. A user interface is generated including the image data and at least one interface indicator at least partially overlapping with the at least one item in the image data. At least one graphical aspect of the interface indicator is selected based on the comparison between the item within the image data and the item within the planogram data.

20 Claims, 13 Drawing Sheets

(51) Int. Cl.
   *G06Q 10/087*      (2023.01)
   *G06V 10/75*       (2022.01)

(56)                References Cited

U.S. PATENT DOCUMENTS

| | | | |
|---|---|---|---|
| 2016/0125345 A1 | 5/2016 | Majumdar et al. | |
| 2017/0177969 A1 | 6/2017 | Zaremski et al. | |
| 2017/0178060 A1* | 6/2017 | Schwartz | G06Q 10/087 |
| 2018/0032216 A1 | 2/2018 | Naous | |
| 2018/0260767 A1* | 9/2018 | Findlay | G06Q 10/087 |
| 2018/0300043 A1* | 10/2018 | Graham | G06V 10/42 |
| 2021/0012272 A1* | 1/2021 | Dugar | G06T 7/0008 |
| 2021/0398060 A1 | 12/2021 | Chaubard | |
| 2024/0177113 A1 | 5/2024 | Figueroa et al. | |

OTHER PUBLICATIONS

ParallelDots, "ShelfWatch for Retail Execution," https://www.paralleldots.com/shelfwatch, (Year: 2023), 8 pages.
R. Patnaik, "Computer Vision for Retail Shelf Monitoring: Optimizing On-Shelf Availability," ImageVision.ai, https://imagevision.ai/blog/computer-vision-for-retail-shelf-monitoring-optimizing-on-shelf-availability/, Feb. 19, 2024, 10 pages.
Shelfie, "Stopping Stock-Outs," https://shelfieretail.com/, Downloaded from Internet Aug. 3, 2024, 8 pages.
Trax, "Next Gen Store Execution: Keep Your Store Relevant With Image Recognition," https://traxretail.com/wp-content/uploads/2017/01/Next-Gen-Store-Execution-Whitepaper.pdf, Jun. 2016, 22 pages.

* cited by examiner

300

Obtain Image Data
302

Generate Annotated Image Data
304

Compare Annotated Image Data to Planogram Data
306

Determine Impact(s) of Image Data Deviations
308

Generate Text-Based Insights/Recommendations
310

Generate User Interface(s)
312

$$x_j^{(n+1)} = f\left(\sum_i x_i^{(n)} \cdot w_{i,j}^{(n)}\right) \tag{Eq. 1}$$

$$w'^{(n)}_{i,j} = w_{i,j}^{(n)} - \gamma \cdot \delta_j^{(n)} \cdot x_i^{(n)} \tag{Eq. 2}$$

$$\delta_j^{(n)} = \left(\sum_k \delta_k^{(n+1)} \cdot w_{j,k}^{(n+1)}\right) \cdot f'\left(\sum_i x_i^{(n)} \cdot w_{i,j}^{(n)}\right) \tag{Eq. 3}$$

$$\delta_j^{(n)} = \left(x_k^{(n+1)} - t_j^{(n+1)}\right) \cdot f'\left(\sum_i x_i^{(n)} \cdot w_{i,j}^{(n)}\right) \tag{Eq. 4}$$

$$f(x) = f\left[a^{(L+1)}\left(h^{(L)}\left(a^{(L)}\left(\ldots\left(h^{(2)}\left(a^{(2)}\left(h^{(1)}\left(a^{(1)}(x)\right)\right)\right)\right)\right)\right)\right)\right] \tag{Eq. 5}$$

$$a^{(l)}(x) = W^{(l)}x + b^{(l)} \tag{Eq. 6}$$

$$y = \beta + f_1(x_1) + f_2(x_2) + \cdots + f_K(x_K) \tag{Eq. 7}$$

$$y = e^{\beta} e^{f(\log x)} e^{\Sigma_i f_i^d(d_i)} \tag{Eq. 8}$$

FIG. 11A $$SHS = 1 - \frac{\sum_i w_i m_i}{\sum_i w_i} \qquad \text{(Eq. 14)}$$

$$m_i \in \{osa_{zero}, osa_{partial}, wanderer, invader, ptm\}$$

- $wanderer = \dfrac{|(s_{ij} \neq l_{ij}, \ \forall a_k \in P)|}{|A|}$      (Eq. 9)

- $invader = \dfrac{|(a_k, \forall a_k \notin P)|}{|A|}$      (Eq. 10)

- $osa_{zero} = \dfrac{|(p_k, \forall p_k \notin A)|}{|\{P\}|}$      (Eq. 11)

- $osa_{partial} = \dfrac{\sum_{i=1}^{k} I\left(\frac{I(p_i \in P)}{I(a_i \in A)} > 0.5\right)}{|\{P\}|}$      (Eq. 12)

- $ptm = 1 - \dfrac{|t_i, \ \forall a_i \in A|}{|A|}$      (Eq. 13)

FIG. 11B

SYSTEMS AND METHODS FOR END-TO-END MODULAR INTELLIGENCE

TECHNICAL FIELD

This application relates generally to image processing, and more particularly, to image processing to compare expected image information to actual image information.

BACKGROUND

Some current layout systems utilize manual and/or automated processes to generate expected layouts for physical environments, such as arrangements of elements within a physical space and/or on a physical item. Expected layouts may be generated in view of one or more goals and/or metrics and may be specifically designed to meet the underlying goals. These current systems are not capable of verifying a correspondence between deployed layouts and expected layouts.

As one non-limiting example, current layout systems may be utilized for generating shelf layouts for positioning of one or more items in a retail environment. After generating a layout, the layouts are provided to other processes, such as manual processes, to implement the layouts. However, these systems are not capable of receiving any feedback regarding the current state of a deployed layout as compared to a planned layout, and therefore discrepancies may exist.

SUMMARY

In various embodiments, a system including a non-transitory memory and a processor communicatively coupled to the non-transitory memory are disclosed. The processor is configured to read a set of instructions to obtain image data of at least one physical display unit, annotate, by an image processing engine, the image data to identify at least one item within the image data, obtain planogram data of a planogram corresponding to the at least one physical display unit, compare the at least one item within the image data to an expected aspect of the at least one item within the planogram data, and generate a user interface including the image data and at least one interface indicator at least partially overlapping with the at least one item in the image data. At least one graphical aspect of the interface indicator is selected based on the comparison of the at least one item within the image data to the expected aspect of the at least one item within the planogram data In various embodiments, a computer-implemented method is disclosed. The method includes steps of obtaining image data of at least one physical display unit, annotating, by an image processing engine, the image data to identify at least one item within the image data, obtaining planogram data of a planogram corresponding to the at least one physical display unit, comparing the at least one item within the image data to an expected aspect of the at least one item within the planogram data, and generating a user interface including the image data and at least one interface indicator at least partially overlapping with the at least one item in the image data. At least one graphical aspect of the interface indicator is selected based on the comparison of the at least one item within the image data to the expected aspect of the at least one item within the planogram data.

In various embodiments, a non-transitory computer readable medium having instructions stored thereon is disclosed. The instructions, when executed by at least one processor, cause at least one device to perform operations including obtaining image data of at least one physical display unit, annotating, by an image processing engine, the image data to identify at least one item within the image data, obtaining planogram data of a planogram corresponding to the at least one physical display unit, comparing the at least one item within the image data to an expected aspect of the at least one item within the planogram data, and generating a user interface including the image data and at least one interface indicator at least partially overlapping with the at least one item in the image data. At least one graphical aspect of the interface indicator is selected based on the comparison of the at least one item within the image data to the expected aspect of the at least one item within the planogram data.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein:

FIGS. 11A-11B illustrate various equations, in accordance with some embodiments.

DETAILED DESCRIPTION

Figure 1:
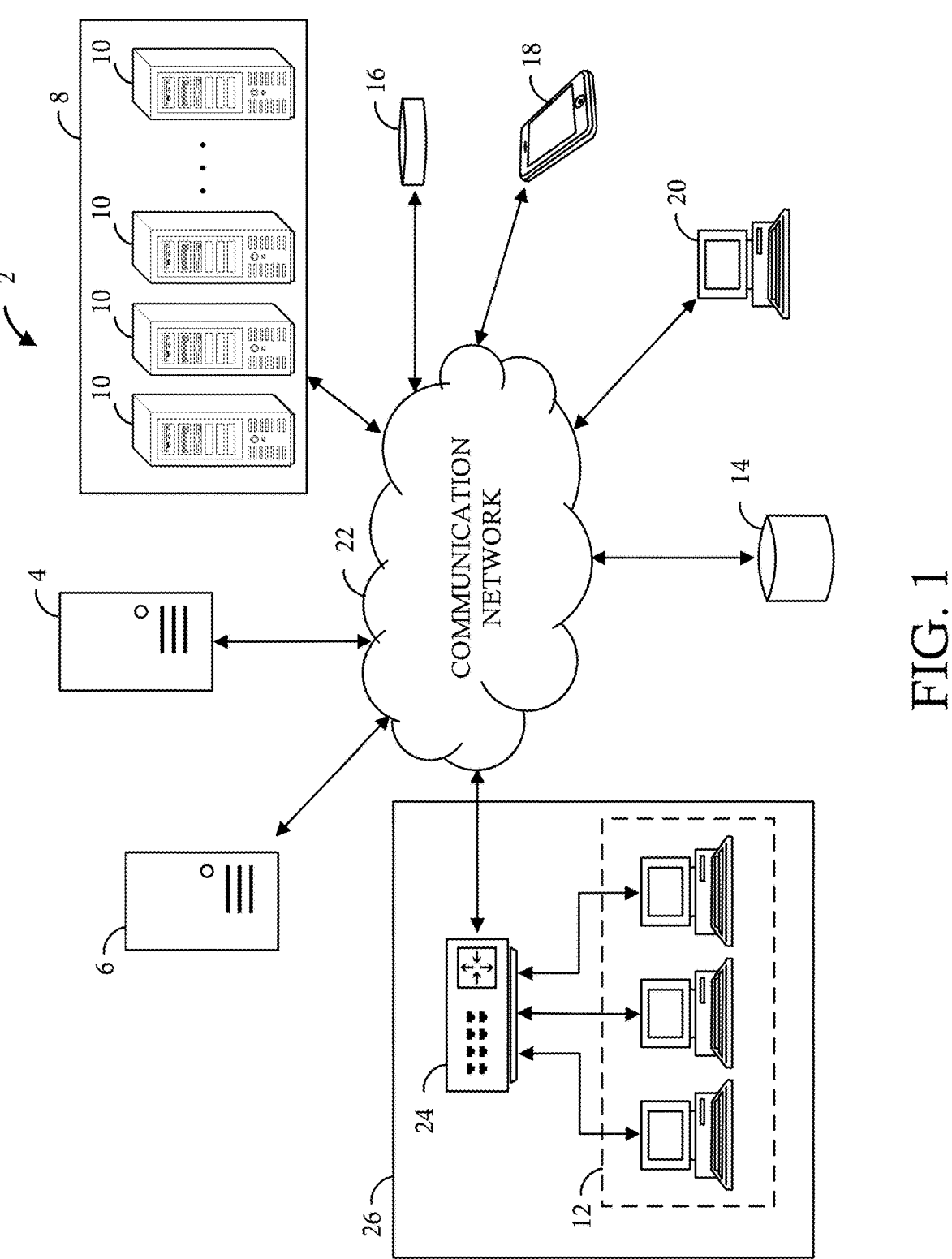
FIG. 1 illustrates a network environment configured to provide automated analysis of deployed layouts utilizing image processing to compare an image of the deployed layout to an expected layout, in accordance with some embodiments.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically connected (e.g., wired, wireless, etc.) to one another either directly or indirectly through intervening systems, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein may be assigned to the other claimed objects and vice versa. In other words, claims for the systems may be improved with features described or claimed in the context of the methods. In this case, the functional features of the method are embodied by objective units of the systems. While the present disclosure is suscep- tible to various modifications and alternative forms, specific embodiments are shown by way of example in the drawings and will be described in detail herein. The objectives and advantages of the claimed subject matter will become more apparent from the following detailed description of these exemplary embodiments in connection with the accompa- nying drawings.

Furthermore, in the following, various embodiments are described with respect to methods and systems for end-to- end modular intelligence through image processing config- ured to automatically compare deployed layouts to expected layouts. In various embodiments, image data for at least one physical space is obtained. The physical space corresponds to a planned location for implementation of a previously generated layout data structure (e.g., planogram, deploy- ment plan, etc.). The image data may be obtained by one or more processes, such as an automated process configured to leverage one or more imaging systems positioned with the corresponding physical space within a field of view of at least one imaging device.

After receiving the image data for the at least one physical space, the image data is processed by one or more image processing modules to annotate the image, for example, to identify one or more items and corresponding locations within the image. The annotated image is provided to a layout comparison module configured to compare the loca- tion of one or more items within the physical space to expected locations of one or more physical items based on a corresponding layout data structure. The layout compari- son module may generate one or more outputs representative of one or more measures of similarity between the image data and the layout data structure. In some embodiments, a score indicative of an overall correspondence between the image data and the layout data structure is generated.

The outputs of the layout comparison module may be provided to one or more metric calculation modules and/or one or more action determination modules. A metric calcu- lation module may be configured to determine an impact one or more expected metrics based on the differences identified between the image data and the layout data structure. An action determination module may be configured to generate one or more action identifiers based on the differences identified between the image data and the layout data structure. One or more graphical interfaces may be gener- ated based on the output of one or more metric calculation modules and/or action determination modules. The gener- ated graphical interfaces may include graphical elements representative of variations within the image data with respect to the layout data structure.

In some embodiments, systems, and methods for end-to- end modular intelligence through image processing config- ured to automatically compare deployed layouts to expected layouts includes one or more trained image processing and annotation models. The trained image processing and anno- tation models may include one or more models, such as one or more object identification models, one or more annotation models, etc.

In general, a trained function mimics cognitive functions that humans associate with other human minds. In particular, by training based on training data the trained function is able to adapt to new circumstances and to detect and extrapolate patterns.

In general, parameters of a trained function may be adapted by means of training. In particular, a combination of supervised training, semi-supervised training, unsupervised training, reinforcement learning and/or active learning may be used. Furthermore, representation learning (an alternative term is "feature learning") may be used. In particular, the parameters of the trained functions may be adapted itera- tively by several steps of training.

FIG. 1 illustrates a network environment 2 configured to provide automated analysis of deployed layouts utilizing image processing to compare an image of the deployed layout to an expected layout, in accordance with some embodiments. The network environment 2 includes a plu- rality of devices or systems configured to communicate over one or more network channels, illustrated as a network cloud 22. For example, in various embodiments, the network environment 2 may include, but is not limited to, a layout comparison computing device 4, a web server 6, a cloud- based engine 8 including one or more processing devices 10, a database 14, and/or one or more user computing devices 16, 18, 20 operatively coupled over the network 22. The layout comparison computing device 4, the web server 6, the processing device(s) 10, and/or the user computing devices 16, 18, 20 may each be a suitable computing device that includes any hardware or hardware and software combina- tion for processing and handling information. For example, each computing device may include, but is not limited to, one or more processors, one or more field-programmable gate arrays (FPGAs), one or more application-specific inte- grated circuits (ASICs), one or more state machines, digital circuitry, and/or any other suitable circuitry. In addition, each computing device may transmit and receive data over the communication network 22.

In some embodiments, each of the layout comparison computing device 4 and the processing device(s) 10 may be a computer, a workstation, a laptop, a server such as a cloud-based server, or any other suitable device. In some embodiments, each of the processing devices 10 is a server that includes one or more processing units, such as one or more graphical processing units (GPUs), one or more central processing units (CPUs), and/or one or more processing cores. Each processing device 10 may, in some embodi- ments, execute one or more virtual machines. In some embodiments, processing resources (e.g., capabilities) of the one or more processing devices 10 are offered as a cloud- based service (e.g., cloud computing). For example, the cloud-based engine 8 may offer computing and storage resources of the one or more processing devices 10 to the layout comparison computing device 4.

In some embodiments, each of the user computing devices 16, 18, 20 may be a cellular phone, a smart phone, a tablet, a personal assistant device, a voice assistant device, a digital assistant, a laptop, a computer, or any other suitable device. In some embodiments, the processing devices 10 are operated by a third party (e.g., a cloud-computing provider). The workstation(s) 12 are operably coupled to the commu- nication network 22 via a router (or switch) 24. The workstation(s) 12 and/or the router 24 may be located at a physical location 26 remote from the layout comparison computing device 4, for example a location at which a layout data structure is implemented. The workstation(s) 12 may communicate with the layout comparison computing device 4 over the communication network 22. The workstation(s) 12 may send data to, and receive data from, the layout comparison computing device 4. For example, the workstation(s) 12 may transmit image data obtained at a corresponding physical location to the layout comparison computing device 4.

Although FIG. 1 illustrates three user computing devices 16, 18, 20, the network environment 2 may include any number of user computing devices 16, 18, 20. Similarly, the network environment 2 may include any number of the layout comparison computing device 4, the web server 6, the processing devices 10, the workstation(s) 12, and/or the databases 14. It will further be appreciated that additional systems, servers, storage mechanism, etc. may be included within the network environment 2. In addition, although embodiments are illustrated herein having individual, discrete systems, it will be appreciated that, in some embodiments, one or more systems may be combined into a single logical and/or physical system. For example, in various embodiments, one or more of the layout comparison computing device 4, the web server 6, the workstation(s) 12, the database 14, the user computing devices 16, 18, 20, and/or the router 24 may be combined into a single logical and/or physical system. Similarly, although embodiments are illustrated having a single instance of each device or system, it will be appreciated that additional instances of a device may be implemented within the network environment 2. In some embodiments, two or more systems may be operated on shared hardware in which each system operates as a separate, discrete system utilizing the shared hardware, for example, according to one or more virtualization schemes.

The communication network 22 may be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 22 may provide access to, for example, the Internet.

Each of the user computing devices 16, 18, 20 may communicate with the web server 6 over the communication network 22. For example, each of the user computing devices 16, 18, 20 may be operable to view, access, and interact with a website, such as a layout analysis and verification website, hosted by the web server 6. The web server 6 may transmit data related to comparison of image data of deployed layouts to planned layouts represented in layout data structures via the website. For example, a user may operate one of the user computing devices 16, 18, 20 to initiate a web browser that is directed to the website hosted by the web server 6. The user may, via the web browser, perform various operations such reviewing comparisons between image data of deployed layouts and planned layouts, view metrics based on differences between layouts, initiate corrective action of layouts, etc.

In some embodiments, the layout comparison computing device 4 may execute one or more models, processes, or algorithms, such as a machine learning model, deep learning model, statistical model, etc., to process image data, determine differences between actual and expected layouts, determine metric impacts, and/or generate output elements for inclusion in a graphical user interface. The layout comparison computing device 4 may transmit information related to analyzed layouts to the web server 6 over the communication network 22, and the web server 6 may display interface elements associated with layout comparisons on the website to the user.

The layout comparison computing device 4 is further operable to communicate with the database 14 over the communication network 22. For example, the layout comparison computing device 4 may store data to, and read data from, the database 14. The database 14 may be a remote storage device, such as a cloud-based server, a disk (e.g., a hard disk), a memory device on another application server, a networked computer, or any other suitable remote storage. Although shown remote to the layout comparison computing device 4, in some embodiments, the database 14 may be a local storage device, such as a hard drive, a non-volatile memory, or a USB stick. The layout comparison computing device 4 may store interaction data received from the web server 6 in the database 14. The layout comparison computing device 4 may also receive from the web server 6 user session data identifying events associated with browsing sessions, and may store the user session data in the database 14.

In some embodiments, the layout comparison computing device 4 generates training data for a plurality of models (e.g., machine learning models, deep learning models, statistical models, algorithms, etc.) based on aggregation data, variant-level data, holiday and event data, recall data, historical user session data, search data, purchase data, catalog data, advertisement data for the users, etc. The layout comparison computing device 4 and/or one or more of the processing devices 10 may train one or more models based on corresponding training data. The layout comparison computing device 4 may store the models in a database, such as in the database 14 (e.g., a cloud storage database).

The models, when executed by the layout comparison computing device 4, allow the layout comparison computing device 4 to recognize elements within image data, compare recognized elements to expected locations of elements derived from a layout data structure, and annotate image data to identify correspondence and/or deviations between the image data and the expected layout of the layout data structure. For example, the layout comparison computing device 4 may obtain one or more models from the database 14.

In some embodiments, the layout comparison computing device 4 assigns the models (or parts thereof) for execution to one or more processing devices 10. For example, each model may be assigned to a virtual machine hosted by a processing device 10. The virtual machine may cause the models or parts thereof to execute on one or more processing units such as GPUs. In some embodiments, the virtual machines assign each model (or part thereof) among a plurality of processing units. Based on the output of the models, layout comparison computing device 4 may generate graphical user interface elements for inclusion in a website representative of a correspondence and/or deviation between items identified within the image data and expected items and locations within the layout data structure.

Figure 2:
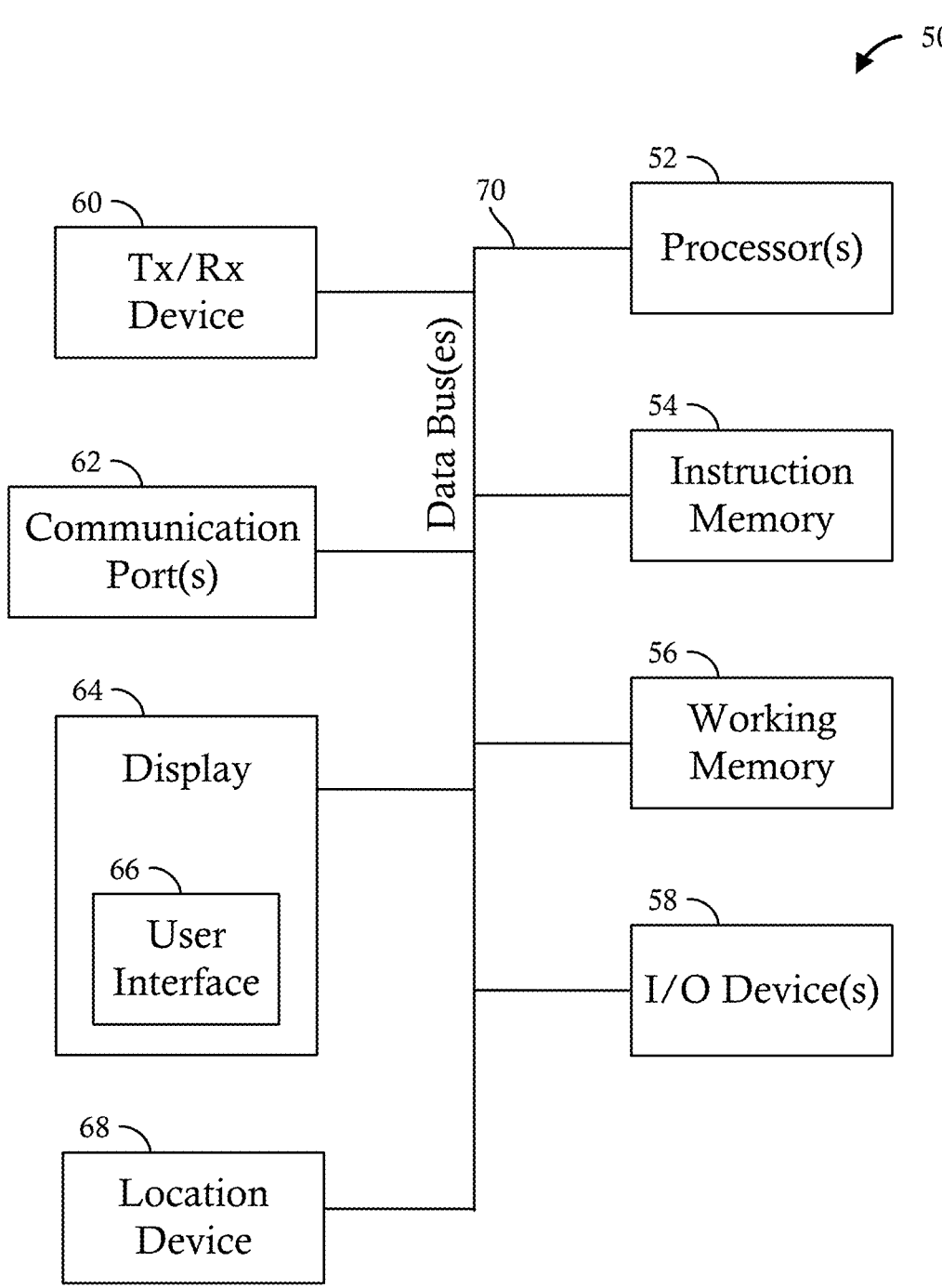
FIG. 2 illustrates a computer system configured to implement one or more processes, in accordance with some embodiments.

FIG. 2 illustrates a block diagram of a computing device 50, in accordance with some embodiments. In some embodiments, each of the layout comparison computing device 4, the web server 6, the one or more processing devices 10, the workstation(s) 12, and/or the user computing devices 16, 18, 20 in FIG. 1 may include the features shown in FIG. 2. Although FIG. 2 is described with respect to certain components shown therein, it will be appreciated that the elements of the computing device 50 may be combined, omitted, and/or replicated. In addition, it will be appreciated that additional elements other than those illustrated in FIG. 2 may be added to the computing device.

As shown in FIG. 2, the computing device 50 may include one or more processors 52, an instruction memory 54, a working memory 56, one or more input/output devices 58, a transceiver 60, one or more communication ports 62, a display 64 with a user interface 66, and an optional location device 68, all operatively coupled to one or more data buses 70. The data buses 70 allow for communication among the various components. The data buses 70 may include wired, or wireless, communication channels.

The one or more processors 52 may include any processing circuitry operable to control operations of the computing device 50. In some embodiments, the one or more processors 52 include one or more distinct processors, each having one or more cores (e.g., processing circuits). Each of the distinct processors may have the same or different structure. The one or more processors 52 may include one or more central processing units (CPUs), one or more graphics processing units (GPUs), application specific integrated circuits (ASICs), digital signal processors (DSPs), a chip multiprocessor (CMP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The one or more processors 52 may also be implemented by a controller, a microcontroller, an application specific integrated circuit (ASIC), a field programmable gate array (FPGA), a programmable logic device (PLD), etc.

In some embodiments, the one or more processors 52 are configured to implement an operating system (OS) and/or various applications. Examples of an OS include, for example, operating systems generally known under various trade names such as Apple macOS™ Microsoft Windows™, Android™, Linux™, and/or any other proprietary or open-source OS. Examples of applications include, for example, network applications, local applications, data input/output applications, user interaction applications, etc.

The instruction memory 54 may store instructions that are accessed (e.g., read) and executed by at least one of the one or more processors 52. For example, the instruction memory 54 may be a non-transitory, computer-readable storage medium such as a read-only memory (ROM), an electrically erasable programmable read-only memory (EEPROM), flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. The one or more processors 52 may be configured to perform a certain function or operation by executing code, stored on the instruction memory 54, embodying the function or operation. For example, the one or more processors 52 may be configured to execute code stored in the instruction memory 54 to perform one or more of any function, method, or operation disclosed herein.

Additionally, the one or more processors 52 may store data to, and read data from, the working memory 56. For example, the one or more processors 52 may store a working set of instructions to the working memory 56, such as instructions loaded from the instruction memory 54. The one or more processors 52 may also use the working memory 56 to store dynamic data created during one or more operations. The working memory 56 may include, for example, random access memory (RAM) such as a static random access memory (SRAM) or dynamic random access memory (DRAM), Double-Data-Rate DRAM (DDR-RAM), synchronous DRAM (SDRAM), an EEPROM, flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. Although embodiments are illustrated herein including separate instruction memory 54 and working memory 56, it will be appreciated that the computing device 50 may include a single memory unit configured to operate as both instruction memory and working memory. Further, although embodiments are discussed herein including non-volatile memory, it will be appreciated that computing device 50 may include volatile memory components in addition to at least one non-volatile memory component.

In some embodiments, the instruction memory 54 and/or the working memory 56 includes an instruction set, in the form of a file for executing various methods, such as methods for comparing a layout represented in image data with an expected layout represented in a layout data structure, as described herein. The instruction set may be stored in any acceptable form of machine-readable instructions, including source code or various appropriate programming languages. Some examples of programming languages that may be used to store the instruction set include, but are not limited to: Java, JavaScript, C, C++, C#, Python, Objective-C, Visual Basic, .NET, HTML, CSS, SQL, NoSQL, Rust, Perl, etc. In some embodiments a compiler or interpreter is configured to convert the instruction set into machine executable code for execution by the one or more processors 52.

The input-output devices 58 may include any suitable device that allows for data input or output. For example, the input-output devices 58 may include one or more of a keyboard, a touchpad, a mouse, a stylus, a touchscreen, a physical button, a speaker, a microphone, a keypad, a click wheel, a motion sensor, a camera, and/or any other suitable input or output device.

The transceiver 60 and/or the communication port(s) 62 allow for communication with a network, such as the communication network 22 of FIG. 1. For example, if the communication network 22 of FIG. 1 is a cellular network, the transceiver 60 is configured to allow communications with the cellular network. In some embodiments, the transceiver 60 is selected based on the type of the communication network 22 the computing device 50 will be operating in. The one or more processors 52 are operable to receive data from, or send data to, a network, such as the communication network 22 of FIG. 1, via the transceiver 60.

The communication port(s) 62 may include any suitable hardware, software, and/or combination of hardware and software that is capable of coupling the computing device 50 to one or more networks and/or additional devices. The communication port(s) 62 may be arranged to operate with any suitable technique for controlling information signals using a desired set of communications protocols, services, or operating procedures. The communication port(s) 62 may include the appropriate physical connectors to connect with a corresponding communications medium, whether wired or wireless, for example, a serial port such as a universal asynchronous receiver/transmitter (UART) connection, a Universal Serial Bus (USB) connection, or any other suitable communication port or connection. In some embodiments, the communication port(s) 62 allows for the programming of executable instructions in the instruction memory 54. In some embodiments, the communication port(s) 62 allow for the transfer (e.g., uploading or downloading) of data, such as machine learning model training data.

In some embodiments, the communication port(s) 62 are configured to couple the computing device 50 to a network. The network may include local area networks (LAN) as well as wide area networks (WAN) including without limitation Internet, wired channels, wireless channels, communication devices including telephones, computers, wire, radio, optical and/or other electromagnetic channels, and combinations thereof, including other devices and/or components capable of/associated with communicating data. For example, the communication environments may include in-body communications, various devices, and various modes of communications such as wireless communications, wired communications, and combinations of the same.

In some embodiments, the transceiver 60 and/or the communication port(s) 62 are configured to utilize one or more communication protocols. Examples of wired protocols may include, but are not limited to, Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc. Examples of wireless protocols may include, but are not limited to, the Institute of Electrical and Electronics Engineers (IEEE) 802.xx series of protocols, such as IEEE 802.11a/b/g/n/ac/ag/ax/be, IEEE 802.16, IEEE 802.20, GSM cellular radiotelephone system protocols with GPRS, CDMA cellular radiotelephone communication systems with 1×RTT, EDGE systems, EV-DO systems, EV-DV systems, HSDPA systems, Wi-Fi Legacy, Wi-Fi 1/2/3/4/5/6/6E, wireless personal area network (PAN) protocols, Bluetooth Specification versions 5.0, 6, 7, legacy Bluetooth protocols, passive or active radio-frequency identification (RFID) protocols, Ultra-Wide Band (UWB), Digital Office (DO), Digital Home, Trusted Platform Module (TPM), ZigBee, etc.

The display 64 may be any suitable display, and may display the user interface 66. The user interface 66 may be a user interface for an application of a network environment operator that allows a user to view and interact with the operator's website. In some embodiments, a user may interact with the user interface 66 by engaging the input-output devices 58. In some embodiments, the display 64 may be a touchscreen, where the user interface 66 is displayed on the touchscreen.

The display 64 may include a screen such as, for example, a Liquid Crystal Display (LCD) screen, a light-emitting diode (LED) screen, an organic LED (OLED) screen, a movable display, a projection, etc. In some embodiments, the display 64 may include a coder/decoder, also known as Codecs, to convert digital media data into analog signals. For example, the visual peripheral output device may include video Codecs, audio Codecs, or any other suitable type of Codec.

The optional location device 68 may be communicatively coupled to a location network and operable to receive position data from the location network. For example, in some embodiments, the location device 68 includes a GPS device configured to receive position data identifying a latitude and longitude from one or more satellites of a GPS constellation. As another example, in some embodiments, the location device 68 is a cellular device configured to receive location data from one or more localized cellular towers. Based on the position data, the computing device 50 may determine a local geographical area (e.g., town, city, state, etc.) of its position.

In some embodiments, the computing device 50 is configured to implement one or more modules or engines, each of which is constructed, programmed, configured, or otherwise adapted, to autonomously carry out a function or set of functions. A module/engine may include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine may also be implemented as a combination of the two, with certain functions facilitated by hardware alone, and other functions facilitated by a combination of hardware and software. In certain implementations, at least a portion, and in some cases, all, of a module/engine may be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine may be realized in a variety of physically realizable configurations, and should generally not be limited to any particular implementation exemplified herein, unless such limitations are expressly called out. In addition, a module/engine may itself be composed of more than one sub-modules or sub-engines, each of which may be regarded as a module/engine in its own right. Moreover, in the embodiments described herein, each of the various modules/engines corresponds to a defined autonomous functionality; however, it should be understood that in other contemplated embodiments, each functionality may be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the embodiments herein.

Figure 3:
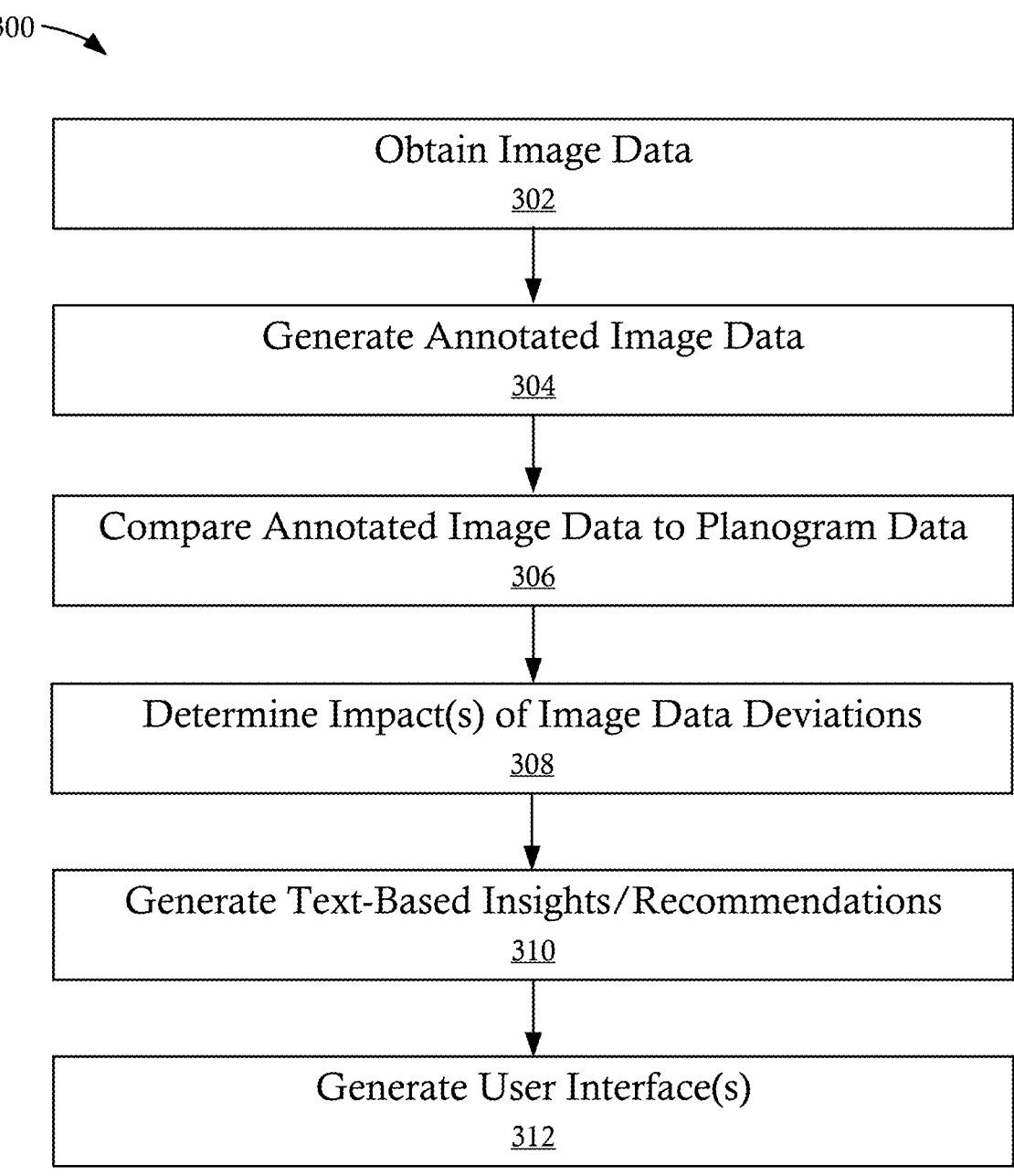
FIG. 3 is a flowchart illustrating an expected deployment comparison method, in accordance with some embodiments.
Figure 4:
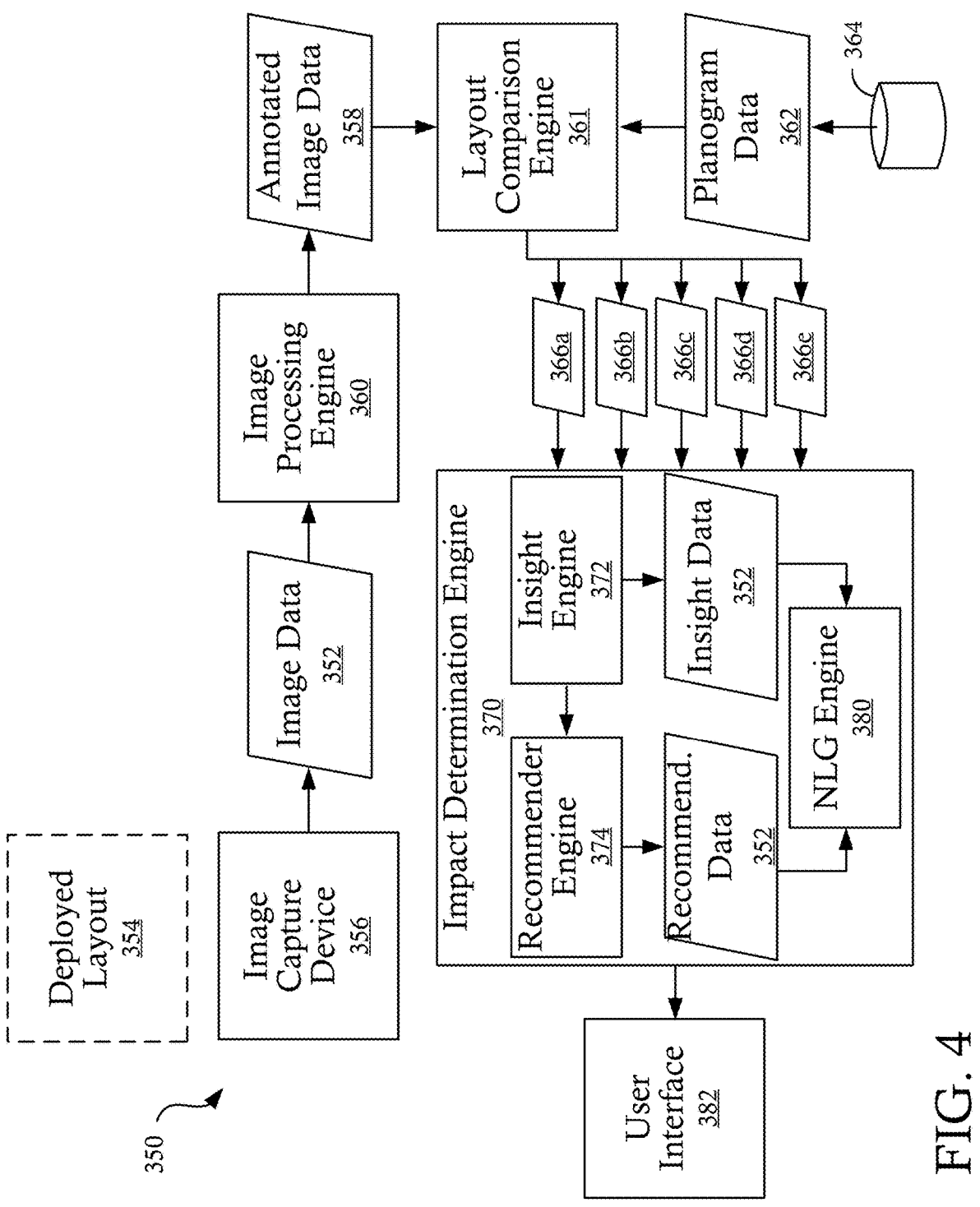
FIG. 4 is a process flow illustrating various steps of the expected deployment comparison method of FIG. 3, in accordance with some embodiments.

FIG. 3 is a flowchart illustrating a layout comparison method 300, in accordance with some embodiments. FIG. 4 is a process flow 350 illustrating various steps of the layout comparison method 300, in accordance with some embodiments. At step 302, image data 352 including at least a portion of a deployed layout 354 is obtained. The image data 352 may be obtained by an imaging mechanism 356. Imaging mechanism 356 may include any suitable imaging mechanism, such as a visual imaging mechanism (e.g., a camera), configured to obtain an image of a physical area. The physical area includes at least one deployed layout 354.

The physical area may include one or more physical display units, e.g., shelving units, endcaps, fixtures, etc.

Figure 5:
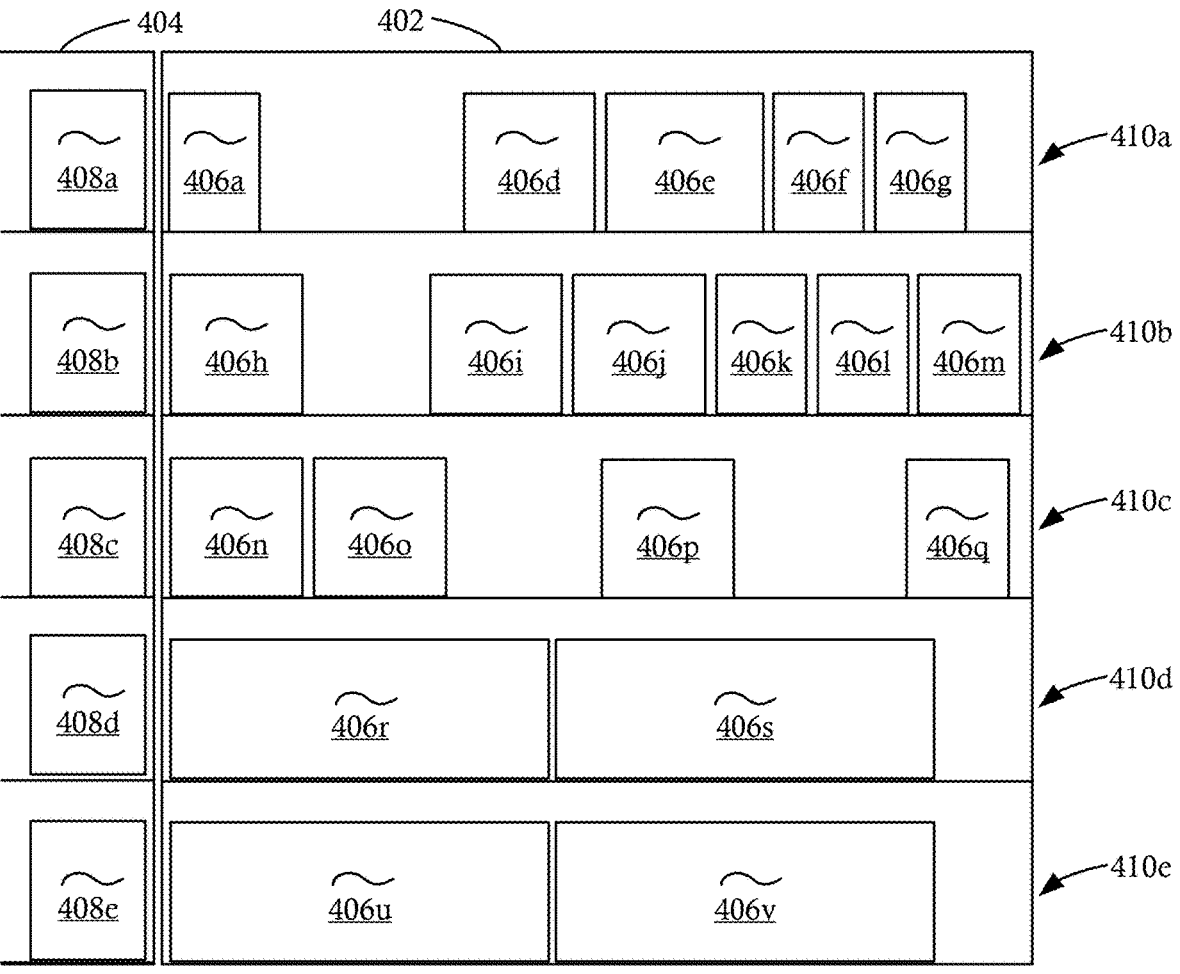
FIG. 5 is a human-interpretable representation of image data of a deployed physical layout, in accordance with some embodiments.

In one non-limiting exemplary embodiment, the physical area includes a retail location and the deployed layout includes at least one fixture positioned within the retail location and configured to support one or more items. For example, the at least one fixture may include one or more shelves and/or shelving bays having a plurality of shelving units, each configured to receive a set of items. FIG. 5 is a representative human perceivable image 400 of an embodiment of image data 352 of a deployed layout 354 on a physical shelving unit, in accordance with some embodiments. The representative human perceivable image 400 of FIG. 5 is provided solely for the purposes of discussion, and it will be appreciated that image data 352 may include any suitable images and/or image elements (e.g., colors, shapes, items, etc.) and will be within the scope this disclosure. Although embodiments are discussed herein including human-readable embodiments of image data 352, it will be appreciated that image data 352 may be provided in a machine-only format that is not capable of interpretation and/or reproduction in a human-interpretable format.

As shown in FIG. 5, a physical area may include a shelving unit 402. The image data 352 may include portions of one or more adjacent shelving units 404. As discussed in greater detail below, in some embodiments, the layout comparison method 300 is configured to exclude portions of adjacent shelving units 404a, 404b and/or items thereon. In the illustrated embodiments, the shelving unit 402 includes one or more items 406a-406v (collectively "items 406") and the adjacent shelving units similarly include one or more items 408a-408e (collectively "items 408"). The shelving unit 402 includes a plurality of shelves 410a-410e that support each of the items 406. Although not illustrated in FIG. 5, it will be appreciated that image data 352, and a human perceivable image 400 generated therefrom, may include additional image elements, such as surrounding background elements, other foreground elements, etc.

At step 304, the image data 352 is processed by one or more image processing engines 360 to generate annotated image data 358, e.g., to add annotations to the image data 352. An image processing engine 360 may be configured to apply one or more computer vision (CV) processes, artificial intelligence (AI) processes, machine learning (ML) processes, and/or other image processing processes to identify and annotate items 406 within the image data 352. In some embodiments, the image processing engine 360 is configured to identify items 406 within a catalog of all available items associated with a physical environment, such as a retail store. As another example, in some embodiments, the image processing engine 360 may be configured to identify items 406 from within a subset of items associated with the physical environment, such as, for example, one or more items associated with a specific department, one or more specific item types, one or more items selected from one or more planograms, etc.

In some embodiments, annotated image data 358 includes location information for each item identified within the image data 352. For example, in some embodiments, the annotated image data 358 includes item location data for each instance of an item identified in the image data 352. Item location data may include, but is not limited to, spatial coordinates identifying a specific location (e.g., X, Y location) within the image data at which a portion of an identified item is located (e.g., top corner, center point, etc.) and/or spatial coordinates identifying an area (e.g., $X_1, Y_1$; $X_2, Y_2$; . . . ; $X_n, Y_n$) occupied by the item within the image data 352. In some embodiments, the annotated image data 358 includes an item identifier for the identified item. For example, an item identifier may include, but is not limited to, a brand and item-specific name, a universal product code, a stock number, a catalog number, etc. corresponding to the identified item.

In some embodiments, multiple contiguous instances of an item may be classified as a single instance of an item occupying a total space corresponding to each of the contiguous instances. For example, in the embodiment illustrated in FIG. 5, items 406a-406c may each be an individual instances of the same item. The annotated image data 358 may annotate items 406a-406c with a single annotation indicating the area occupied by items 406a-406c to be a single area occupied by the corresponding item. Although specific embodiments are discussed herein, it will be appreciated that any suitable image annotations may be generated and incorporated into the annotated image data 358. Further, although embodiments are discussed herein including annotated image data 358, it will be appreciated that, in some embodiments, image data 352 and image annotations may be stored and/or provided as separate data elements.

In some embodiments, the image processing engine 360 may be configured to identify specific items and/or sets of items within the image data 352. For example, in some embodiments, a set of items sharing one or more common features (e.g., common brand, common category, common subcategory, etc.) is identified by the image processing engine 360. The image processing engine 360 may include representative data for identifying the set of items and may annotate, tag, or otherwise identify only those items included in the set of items while ignoring (e.g., not annotating) any items within the image data 352 that are not in the set of items.

At step 306, the annotated image data 358 is compared to at least one planogram for the corresponding physical location to determine one or more metrics for the corresponding physical space, e.g., shelving unit 402. For example, in some embodiments, the annotated image data 358 is provided to a layout comparison engine 361. The layout comparison engine 361 is configured to obtain one or more planograms 362 from a planogram store 364. The one or more planograms 362 are representative of an expected and/or ideal arrangement of items within the physical area represented in the annotated image data 358. In some embodiments, a physical layout for a larger physical space containing the physical area represented in the annotated image data 358, such as a store containing a shelving unit 402, is obtained and used to identify corresponding planogram data 362 for the annotated image data 358. In some embodiments, planogram data 362 may be identified based on location data, such as physical location data corresponding to a physical location of the imaging mechanism 356 when the image data 352 was obtained.

Figure 6:
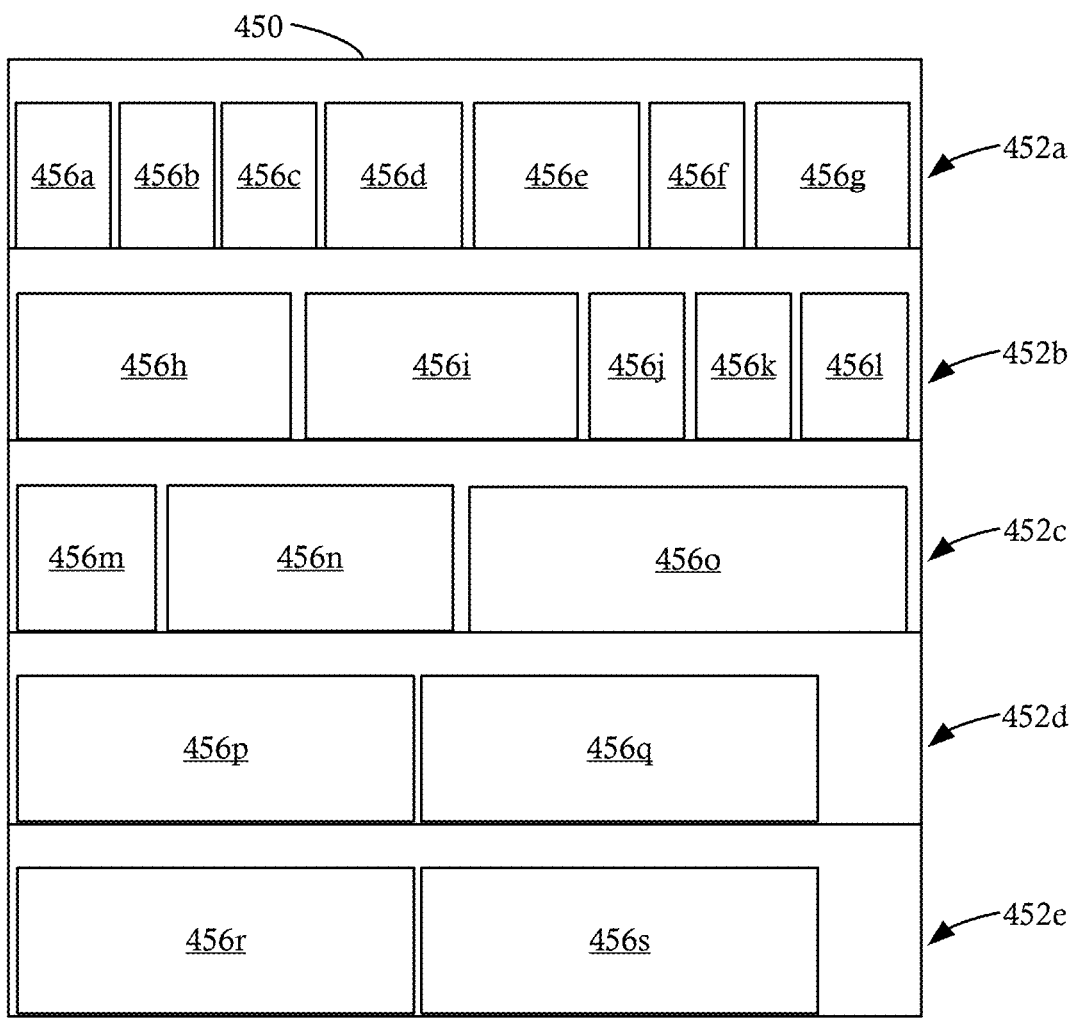
FIG. 6 is a human-interpretable representation of planogram data for a physical deployment unit corresponding to the image data of FIG. 5, in accordance with some embodiments.

FIG. 6 is a representative human perceivable image 450 of an embodiment of planogram data 362, in accordance with some embodiments. The representative human perceivable image 450 of FIG. 6 is provided solely for the purposes of discussion, and it will be appreciated that planogram data 362 may include any suitable computer-readable data (e.g., image data that may or may not be capable of rendering as a human perceivable image, non-image position data, etc.) and will be within the scope this disclosure. Although embodiments are discussed herein with respect to a human perceivable form 450 of planogram data 362, it will be appreciated that planogram data 362 may be provided in a machine-only format that is not capable of interpretation and/or reproduction in a human-interpretable format.

As shown in FIG. 6, planogram data 362 may include vertical layers 452a-452e corresponding to the shelves 404a-404e of a shelving unit 402 to be arranged according to the planogram data 362. The planogram data 362 further includes expected and/or planned positions for one or more instances of items 456a-456s (collectively "expected items 456"). The vertical layers 452a-452e include corresponding horizontal locations (e.g., grid coordinates, relative locations, dimensional information, etc.) configured to provide expected positions for each of the expected items 456a.

In some embodiments, the layout comparison engine 361 is configured to compare the annotated image data 358 with a corresponding planogram 362 to determine deviations between the annotated image data 358 and the planogram 362. The planogram 362 may include expected locations and/or quantities of one or more items for the corresponding physical location. For example, a planogram 362 for the shelving unit 402 may include data representative expected or planned quantities and locations of specific items for the shelving unit 402. In some embodiments, the planogram 362 includes data provided in a grid and/or other format capable of being aligned and/or overlayed with the annotated image data 358.

In some embodiments, the image identifiers and locations denoted by the annotations in the annotated image data 358 are utilized to compare the annotated image data 358 to the planogram 362. For example, in some embodiments, an item identifiers for an item positioned at a first location within the annotated image data 358 (as identified by the image annotations) is compared to an item identifier of an item positioned in a corresponding position (e.g., corresponding X, Y position or corresponding area). If the item identifiers match, the layout comparison engine 361 determines a correct correspondence between the annotated image data 358 and the planogram 362. Alternatively, if the item identifiers do not match and/or the position information does not match, the layout comparison engine 361 may identify a non-correspondence between the annotated image data 358 and the planogram 362. In some embodiments, one or more scores are determined for one or more types of non-correspondence.

In some embodiments, one or more comparison metrics (e.g., shelf health metrics) may be generated based on the comparison of the annotated image data 358 with the corresponding planogram 362. For example, in various embodiments, one or more on-shelf availability ("OSA") scores, misplaced item scores, tag/label missing ("PTM") scores, positional scores, etc. may be determined. In some embodiments, one or more aggregated scores, such as an aggregated comparison metric (e.g., an aggregate shelf health score), may be generated by aggregating one or more of the generated comparison metrics.

In some embodiments, a first misplaced item score, e.g., a "wanderer" score 366a, may be representative of items that are expected to be positioned on and/or within the physical space represented in the annotated image data 358, but is not positioned in the correct position based on a comparison between the annotated image data 358 and the planogram 362. A wanderer score 366a may be generated, for example, according to equation 9 of FIG. 11B, where $S_{ij}$ is an item position in the planogram 362, $l_{ij}$ is an item position in the annotated image data 358, A is the set of annotated items in the annotated image data 358, where A:$(a_1, a_2, a_3, \ldots, a_n)$, $a_i \in A$, and P is the set of planogram items in the planogram data 362, where P:$(p_1, p_2, p_3, \ldots, p_n)$, $p_i \in P$. In some embodiments, a second misplaced item score, e.g., a "invader" score 366b, may be representative of items included in the annotated image data 358 that are not included in the planogram 362. An invader score 366b may be generated, for example, according to equation 10 in FIG. 11B. Similarly, in some embodiments, an $osa_{zero}$ 366c and an $osa_{partial}$ score 366d may each be calculated representative of on-shelf availability of a given item. An $osa_{zero}$ score 366c representative of items 404 with zero on-shelf availability may be determined according to equation 11 and the $osa_{partial}$ score 366d representative of items 406 having partial on-shelf availability that is less than expected based on the planogram data 362 may be determined according to equation 12 in FIG. 11B. In some embodiments, a ptm score 366e representative of items 404 lacking additional expected elements within the annotated image data 358, such as missing labels, may be generated in accordance with equation 13 in FIG. 11B, where T is a set of physical item identifiers in the annotated image data 358, where T: $(t_1, t_2, t_3, \ldots, t_n)$, $t_i \in T$.

In some embodiments, an aggregate comparison metric 368 may be determined according to equation 14 in FIG. 11B. The aggregate comparison metric 368 provides a single reference value for determining the overall compliance between the annotated image data 358 and the planogram data 362, while each of the individual comparison metrics provide additional information regarding the areas of compliance and/or non-compliance between the annotated image data 358 and the planogram data 362.

At step 308, one or more impacts are determined for the differences (e.g., quantified discrepancies) between the annotated image data 358 and the planogram data 362. the aggregate comparison metric 368 is provided to an impact determination engine 370 configured to determine an impact of the variance between the shelf as represented in the annotated image data 358 and the planogram data 362. For example, in some embodiments, the impact determination engine 370 is configured to receive one or more additional data inputs, such as a historical sales data, demand forecast data, etc., and generate, in combination with the aggregate comparison metric 368 (or individual underlying metrics 366a-366e), one or more impact values, such as a potential loss value, a prioritization value, etc. In addition, the impact determination engine 370 may be configured to identify one or more actions to be taken based on the one or more impact values.

At step 310, one or more text-based insights and/or recommendations are generated. For example, in some embodiments, the impact determination engine 370 includes one or more engines configured to receive the aggregate comparison metric 368 and/or additional data and output one or more text-based insights and/or recommendations. For example, in the illustrated embodiment, the impact determination engine 370a includes an insight engine 372 and a recommender engine 374, each configured to generate machine-readable insight data 376 and machine-readable recommendation data 378, respectively. The insight engine 372 may be configured to implement one or more trained machine learning models, such as an anomaly detection model (e.g., an isolation forest model) configured to identify trends based on the deviations between the annotated image data 358 and the planogram data 362. For example, the insight engine 372 may be configured to identify anomalies and/or repeating trends within one or more annotated images with respect to corresponding planogram data 362.

In some embodiments, an output of the insight engine 372 is provided to a recommender engine 374. The recommender engine 374 is configured to receive insight data 376 and/or one or more metrics, such as casual metrics (e.g., aggregate comparison metric 368) and output one or more recommendations for addressing the discrepancies between the annotated image data 358 and the planogram data 362. The recommendations may include changes to the shelving unit 402 corresponding to the annotated image data 358. For example, in various embodiments, the recommendations may include, but are not limited to, recommendations to reposition one or more items 406, recommendations to remove one or more items 406, recommendations to restock one or more items, etc. The recommendations may be generated in machine-interpretable formats, such as, for example, character strings, vectors, etc.

In some embodiments, the output of the insight engine 372 and/or the recommender engine 374 is provided to a natural language generation (NLG) engine 380 configured to generate human-interpretable text to convey the insights and/or recommendations for a given shelving unit 402. The NLG engine 380 may implement one or more NLG models and/or processes, such as T5-transformer based process, a generative process, etc. The NLG engine 380 may be configured to generate actionable, human-interpretable text-based insights and/or recommendations for display on a user interface. For example, in some embodiments, the NLG engine 380 is configured to generate one or more text-based recommendations such as indications to divert manpower to an area of a physical environment including the imaged shelving unit 402, planning and/or updating delivery/purchase orders for predetermined time periods, planning and/or updating restocking processes for predetermined time periods, etc.

In some embodiments, additional data, such as near-real time data (e.g., physical back-room inventory, transit inventory, etc.), pickup and delivery data, etc. may be used in conjunction with the planogram data 362 to generate comparison metrics, insights, and/or recommendations. For example, in various embodiments, one or more insights and/or recommendations generated based on a comparison metric may be adjusted and/or modified based on near-real time data for inventory (e.g., adjusting a restock recommendation to a reorder recommendation when available stock of a corresponding item is below a required amount for a restock recommendation).

At step 312, one or more user interfaces 382 are generated including graphical representations of one or more comparison metrics, one or more aggregated comparison metrics, one or more text-based insights or recommendations, annotated image data 358, and/or additionally annotated image data. For example, in various embodiments, user interfaces may be configured to enable a user to select one or more categories, physical locations, items, brands, etc. and view one or more comparison metrics and/or aggregated comparison metrics for the corresponding selection. In some embodiments, each of an available selection option (e.g., each selectable category, subcategory, etc.) may be presented in a ranked order according to one or more metrics and/or aggregated metrics. In one non-limiting example, subcategories within a selected category are presented in ranked order from lowest aggregate comparison metric 368 to highest aggregate comparison metric 368.

As another example, in various embodiments, user interfaces may be configured to enable a user to select one or more categories, subcategories, physical locations, etc. and view one or more comparison and/or aggregated comparison metrics over a selected and/or predetermined time period, such as in a graphical format, list format, tabular format, etc.

In some embodiments, the predetermined time period includes a real-time and/or rolling time period, e.g., the last X days, last X weeks, last X months, etc. In some embodiments, a user interface is configured to related comparison metrics for a selected category, subcategory, brand, physical location, etc. to comparison metrics for similar categories, subcategories, brands, physical locations, etc.

As yet another example, in various embodiments, user interfaces may be configured to display each of the calculated comparison metrics and/or aggregate comparison metrics to allow a user to identify trends and/or causes based on the generated metrics. For example, in some embodiments, a user interface may be configured to display each calculated comparison metric for a selected category, subcategory, shelving unit, etc., for example in graphical form, to allow identification of one or more causes or impacts.

In some embodiments, one or more user interfaces may include one or more interface elements configured to present and/or represent text-based insights and/or recommendations generated at step 310. For example, in some embodiments, a panel or other interface container is configured to display one or more interface elements, such as a graphical interface element, text-based interface elements, etc. representative of the insights and/or recommendations for the corresponding shelving unit, category, subcategory, etc. The interface panel may include, but is not limited to, text-based interface elements providing observations (e.g., information regarding how a selected category, subcategory, shelving unit, etc.) is performing (e.g., trends for an aggregate comparison score), geographic-based insights (e.g., information regarding aggregated metrics within defined geographic areas), planogram insights (e.g., information regarding comparison to aggregated planogram data 362), recommendations (e.g., executable actions for improving performance metrics), etc.

Figure 7A:
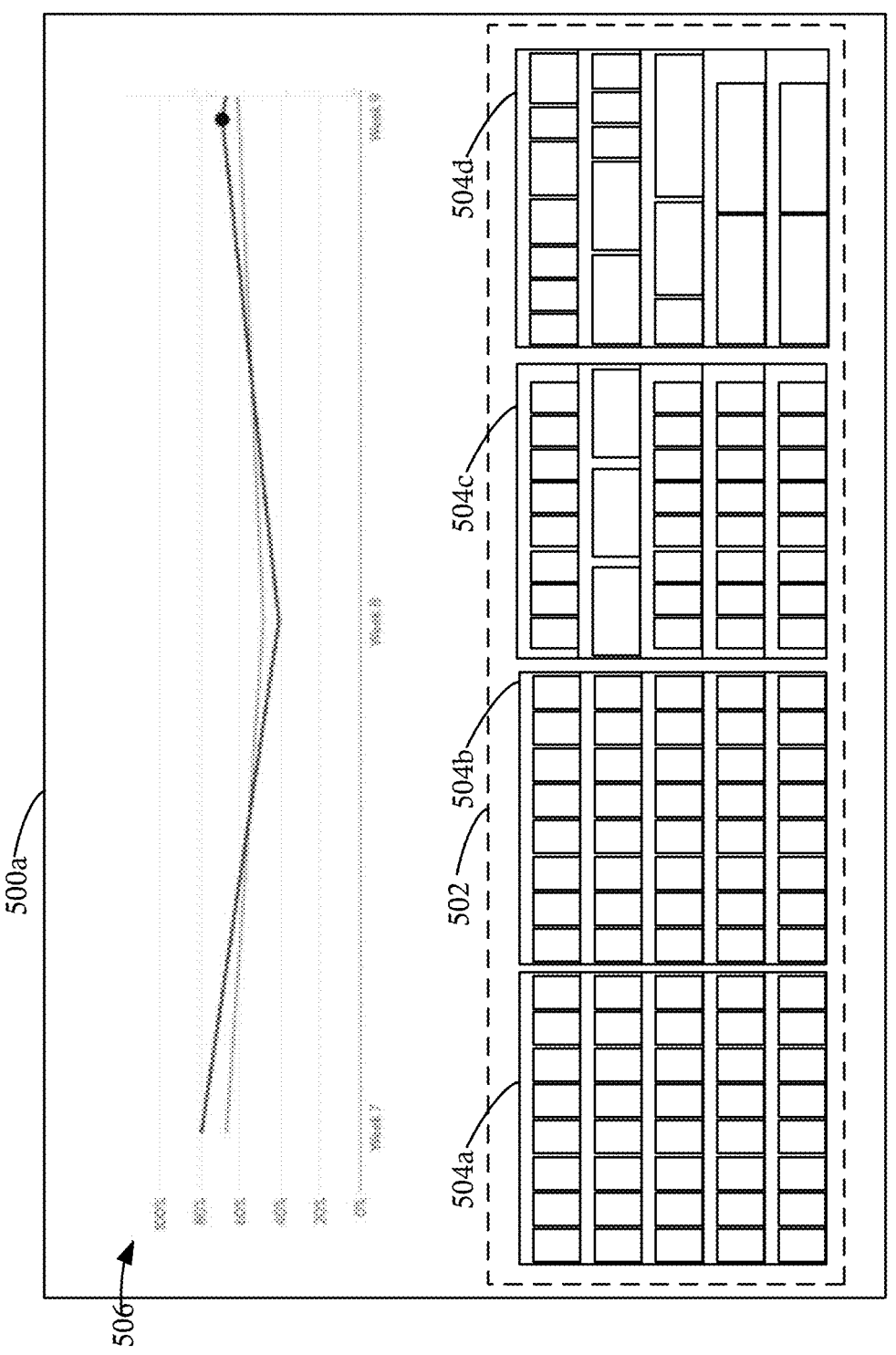
FIG. 7A illustrates a user interface including a carousel container having a plurality of graphical representations of planogram data, in accordance with some embodiments.

In some embodiments, a user interface includes one or more graphical representations of image data 352, annotated image data 358, planogram data 362, and/or additionally annotated image data. FIG. 7A illustrates a user interface 382a including a carousel container 502 configure to display a plurality of interface elements 504a-504d representative of image data 352 and/or planogram data 362. In the illustrated embodiment, the carousel container 502 includes four interface elements 504a-504d, although it will be appreciated that any suitable number of interface elements may be included. Each of the interface elements 504a-504d may be configured, either individually and/or collectively, to display one of a human-interpretable rendering of image data 352 corresponding to an imaged shelving unit 402 or human-interpretable rendering of planogram data 362 corresponding to the assigned planogram for the imaged shelving unit 402. In the illustrated embodiments, the first two interface elements 504a, 504b include renderings of image data 352 and the final two interface elements 504c, 504d include renderings of planogram data 362, although it will be appreciated that any suitable combination of image data 352 and/or planogram data 362 may be provided in the carousel container 502. Although embodiments are discussed herein including a carousel container 502, it will be appreciated that any suitable container and/or interface configuration may be utilized to display the interface elements 504a-504d to a user.

In some embodiments, the user interface 382a includes a metric display portion 508 configured to display one or more interface elements representative of one or more individual comparison metrics and/or aggregate comparison metrics. For example, in various embodiments, the metric display portion 508 may be configured to include one or more graph (e.g., chart) representations of one or more metrics, a table or list representation of one or more metrics, and/or any other suitable representation of one or more metrics. In some embodiments, the comparison metrics illustrated in the metric display portion 508 are related to a physical display unit corresponding to an interface element 504a-504d selected within the carousel container 502. Although specific embodiments are discussed herein, it will be appreciated that any suitable metrics, textual information, and/or other interface elements may be included within a user interface, such as user interface 500a.

Figure 7B:
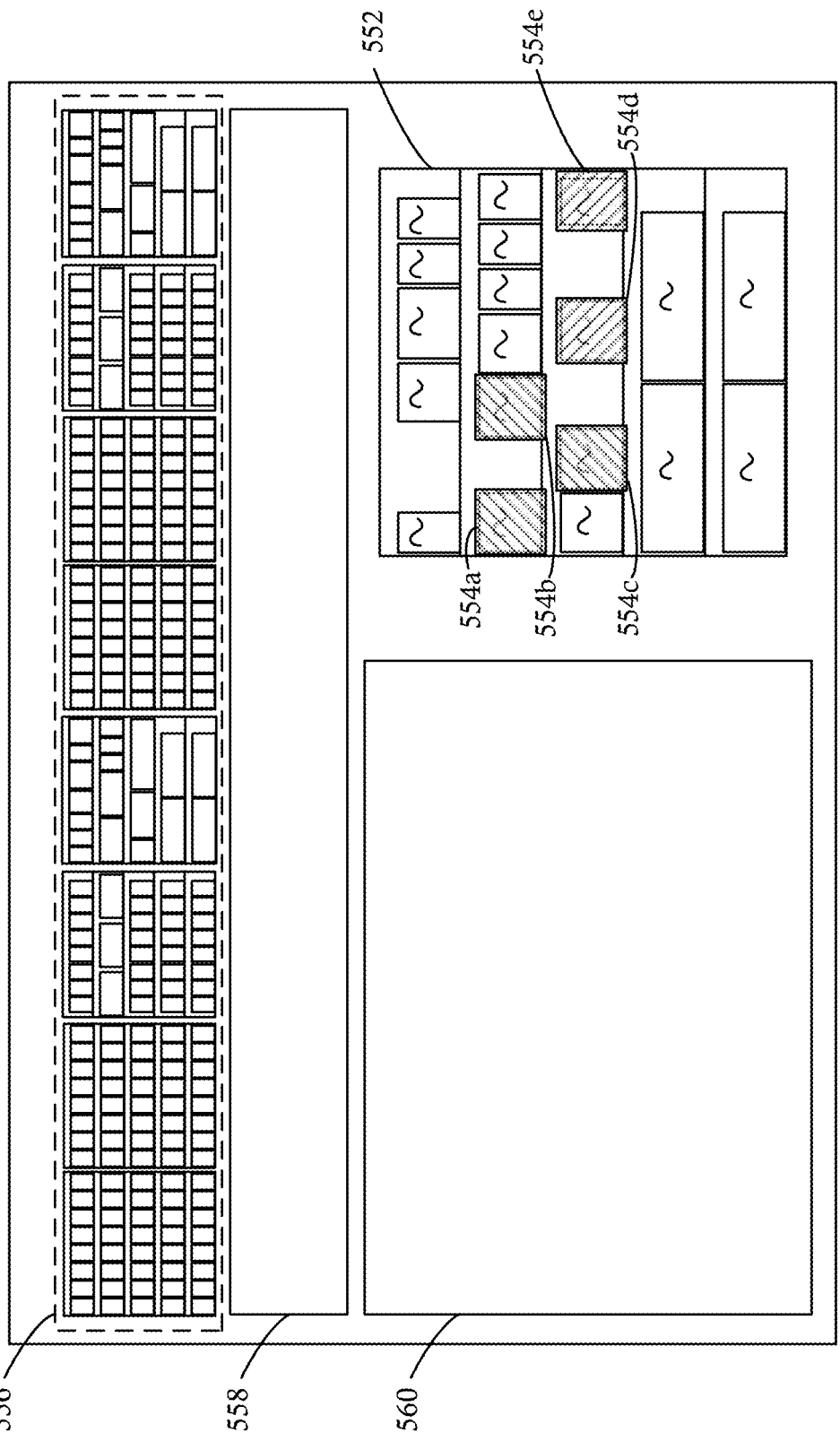
FIG. 7B illustrates a user interface including a plurality of interface indicators overlayed on a human-interpretable graphical representation of image data of a deployed physical layout, in accordance with some embodiments.

In some embodiments, a user interface includes additional interface annotations configured to highlight, display, and/or otherwise relate to one or more comparison metrics, insights, and/or recommendations. FIG. 7B illustrates a user interface 382b including an interface element 550 representative of annotated image data, such as annotated image data 358 and/or further annotated image data. The user interface 382b includes a plurality of interface indicators 554a-554e overlayed on a human-interpretable rendering 552 of image data 352 corresponding to an image physical display. The plurality of interface indicators 554a-554e may be configured to identify one or more items within the image data 352 in relation to one or more comparison metrics and/or other metrics. For example, in the illustrated embodiment, a first set of interface indicators 554a-554c correspond to items having low comparison metrics (e.g., items having significant deviations from planogram data 362) and a second set of interface indicators 554d, 554e correspond to items having high comparison metrics (e.g., items having insignificant or no deviations from planogram data 362). Although specific embodiments are discussed herein, it will be appreciated that any suitable set of interface indicators may be included in the user interface 382b corresponding to any user-interpretable metrics, insights, recommendations, etc.

In some embodiments, a physical display unit corresponding to the human-interpretable rendering 552 of image data 352 may be selected based on a planogram data selection made via a planogram carousel 556. The planogram carousel 556 may display human-interpretable renderings of planogram data 362 for one or more planograms. Selection of one of the displayed renderings may cause the image data 352 and corresponding interface indicators 554a-554e for the related physical display unit to be illustrated on the user interface 382b. In some embodiments, the user interface 382b further includes one or more additional interface zones 558, 560 each configured to display and/or contain additional information regarding the physical display unit corresponding to the image data 352 and/or aggregated data regarding planogram data 362 of one or more planograms.

Figure 8:
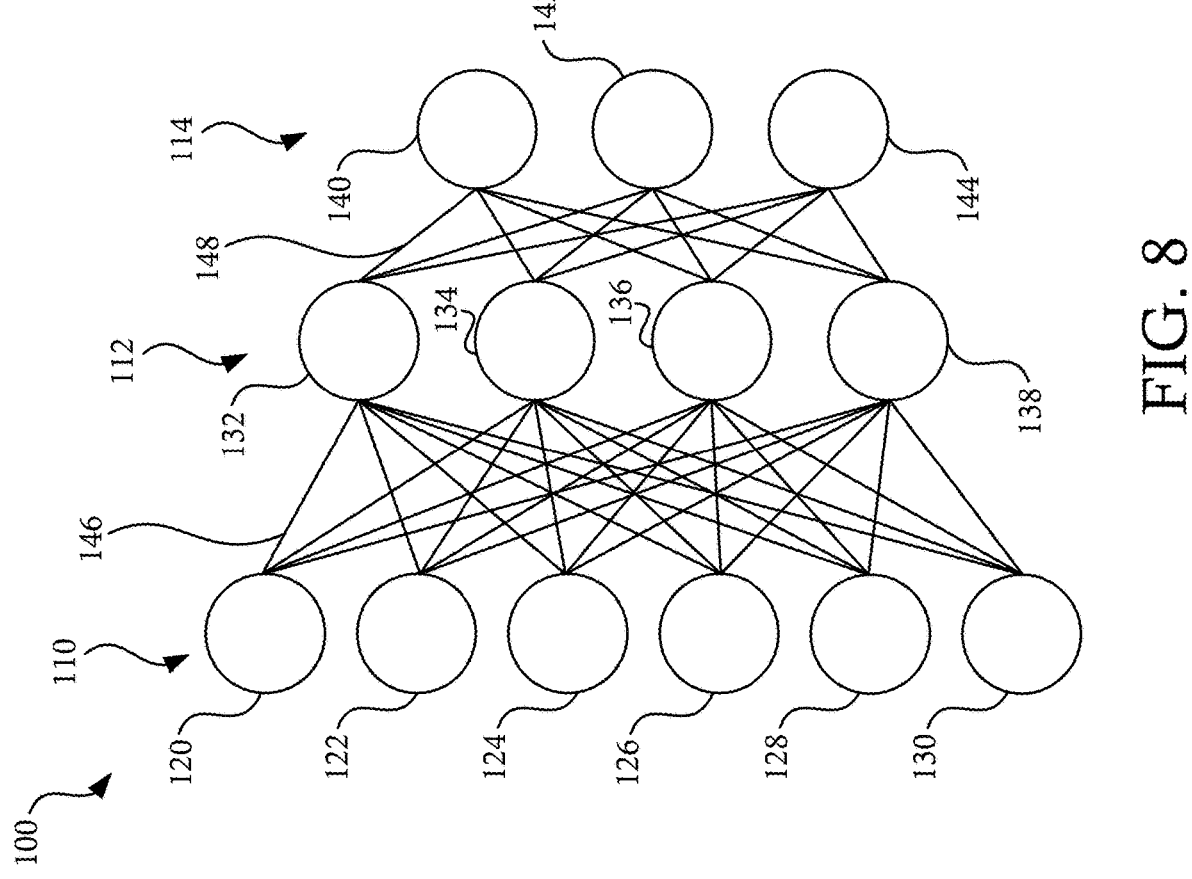
FIG. 8 illustrates an artificial neural network, in accordance with some embodiments.

FIG. 8 illustrates an artificial neural network 100, in accordance with some embodiments. Alternative terms for "artificial neural network" are "neural network," "artificial neural net," "neural net," or "trained function." The neural network 100 comprises nodes 120-144 and edges 146-148, wherein each edge 146-148 is a directed connection from a first node 120-138 to a second node 132-144. In general, the first node 120-138 and the second node 132-144 are different nodes, although it is also possible that the first node 120-138 and the second node 132-144 are identical. For example, in FIG. 8 the edge 146 is a directed connection from the node 120 to the node 132, and the edge 148 is a directed connection from the node 132 to the node 140. An edge 146-148 from a first node 120-138 to a second node 132-144 is also denoted as "ingoing edge" for the second node 132-144 and as "outgoing edge" for the first node 120-138.

The nodes 120-144 of the neural network 100 may be arranged in layers 110-114, wherein the layers may comprise an intrinsic order introduced by the edges 146-148 between the nodes 120-144 such that edges 146-148 exist only between neighboring layers of nodes. In the illustrated embodiment, there is an input layer 110 comprising only nodes 120-130 without an incoming edge, an output layer 114 comprising only nodes 140-144 without outgoing edges, and a hidden layer 112 in-between the input layer 110 and the output layer 114. In general, the number of hidden layer 112 may be chosen arbitrarily and/or through training. The number of nodes 120-130 within the input layer 110 usually relates to the number of input values of the neural network, and the number of nodes 140-144 within the output layer 114 usually relates to the number of output values of the neural network.

In particular, a (real) number may be assigned as a value to every node 120-144 of the neural network 100. Here, $$x_i^{(n)}$$

denotes the value of the i-th node 120-144 of the n-th layer 110-114. The values of the nodes 120-130 of the input layer 110 are equivalent to the input values of the neural network 100, the values of the nodes 140-144 of the output layer 114 are equivalent to the output value of the neural network 100. Furthermore, each edge 146-148 may comprise a weight being a real number, in particular, the weight is a real number within the interval $[-1, 1]$, within the interval $[0, 1]$, and/or within any other suitable interval. Here, $$w_{i,j}^{(m,n)}$$

denotes the weight of the edge between the i-th node 120-138 of the m-th layer 110, 112 and the j-th node 132-144 of the n-th layer 112, 114. Furthermore, the abbreviation $$w_{i,j}^{(n)}$$

is defined for the weight $$w_{i,j}^{(n,n+1)}.$$

In particular, to calculate the output values of the neural network 100, the input values are propagated through the neural network. In particular, the values of the nodes 132-144 of the (n+1)-th layer 112, 114 may be calculated based on the values of the nodes 120-138 of the n-th layer 110, 112 by equation 1 in FIG. 13A, wherein the function f is a transfer function (another term is "activation function"). Known transfer functions are step functions, sigmoid function (e.g., the logistic function, the generalized logistic function, the hyperbolic tangent, the Arctangent function, the error function, the smooth step function) or rectifier functions. The transfer function is mainly used for normalization purposes.

In particular, the values are propagated layer-wise through the neural network, wherein values of the input layer 110 are given by the input of the neural network 100, wherein values of the hidden layer(s) 112 may be calculated based on the values of the input layer 110 of the neural network and/or based on the values of a prior hidden layer, etc.

In order to set the values $$w_{i,j}^{(m,n)}$$

for the edges, the neural network 100 has to be trained using training data. In particular, training data comprises training input data and training output data. For a training step, the neural network 100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 100 (backpropagation algorithm). In particular, the weights are changed according to equation 2 in FIG. 13A, wherein $\gamma$ is a learning rate, and the numbers $$\delta_j^{(n)}$$

may be recursively calculated according to equation 3 in FIG. 13A based on $$\delta_j^{(n+1)},$$

if the (n+1)-th layer is not the output layer and equation 4 in FIG. 13A if the (n+1)-th layer is the output layer 114, wherein f' is the first derivative of the activation function, and $$y_j^{(n+1)}$$

is the comparison training value for the j-th node of the output layer 114.

Figure 9:
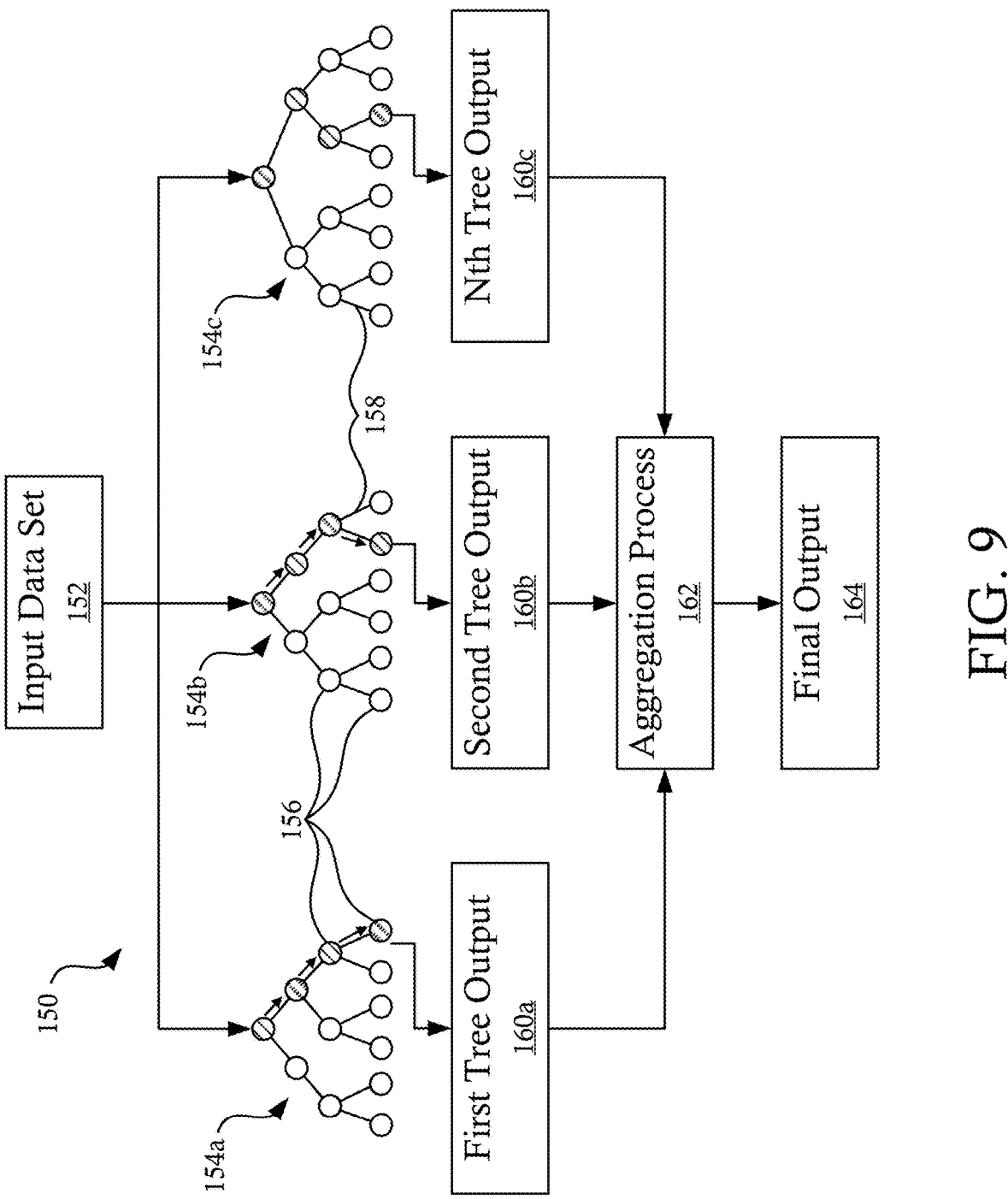
FIG. 9 illustrates a tree-based artificial neural network, in accordance with some embodiments.

FIG. 9 illustrates a tree-based neural network 150, in accordance with some embodiments. In particular, the tree-based neural network 150 is a random forest neural network, though it will be appreciated that the discussion herein is applicable to other decision tree neural networks. The tree-based neural network 150 includes a plurality of trained decision trees 154a-154c each including a set of nodes 156 (also referred to as "leaves") and a set of edges 158 (also referred to as "branches").

Each of the trained decision trees 154a-154c may include a classification and/or a regression tree (CART). Classification trees include a tree model in which a target variable may take a discrete set of values, e.g., may be classified as one of a set of values. In classification trees, each leaf 156 represents class labels and each of the branches 158 represents conjunctions of features that connect the class labels. Regression trees include a tree model in which the target variable may take continuous values (e.g., a real number value).

In operation, an input data set 152 including one or more features or attributes is received. A subset of the input data set 152 is provided to each of the trained decision trees 154a-154c. The subset may include a portion of and/or all of the features or attributes included in the input data set 152. Each of the trained decision trees 154a-154c is trained to receive the subset of the input data set 152 and generate a tree output value 160a-160c, such as a classification or regression output. The individual tree output value 160a-160c is determined by traversing the trained decision trees 154a-154c to arrive at a final leaf (or node) 156.

In some embodiments, the tree-based neural network 150 applies an aggregation process 162 to combine the output of each of the trained decision trees 154a-154c into a final output 164. For example, in embodiments including classification trees, the tree-based neural network 150 may apply a majority-voting process to identify a classification selected by the majority of the trained decision trees 154a-154c. As another example, in embodiments including regression trees, the tree-based neural network 150 may apply an average, mean, and/or other mathematical process to generate a composite output of the trained decision trees. The final output 164 is provided as an output of the tree-based neural network 150.

Figure 10:
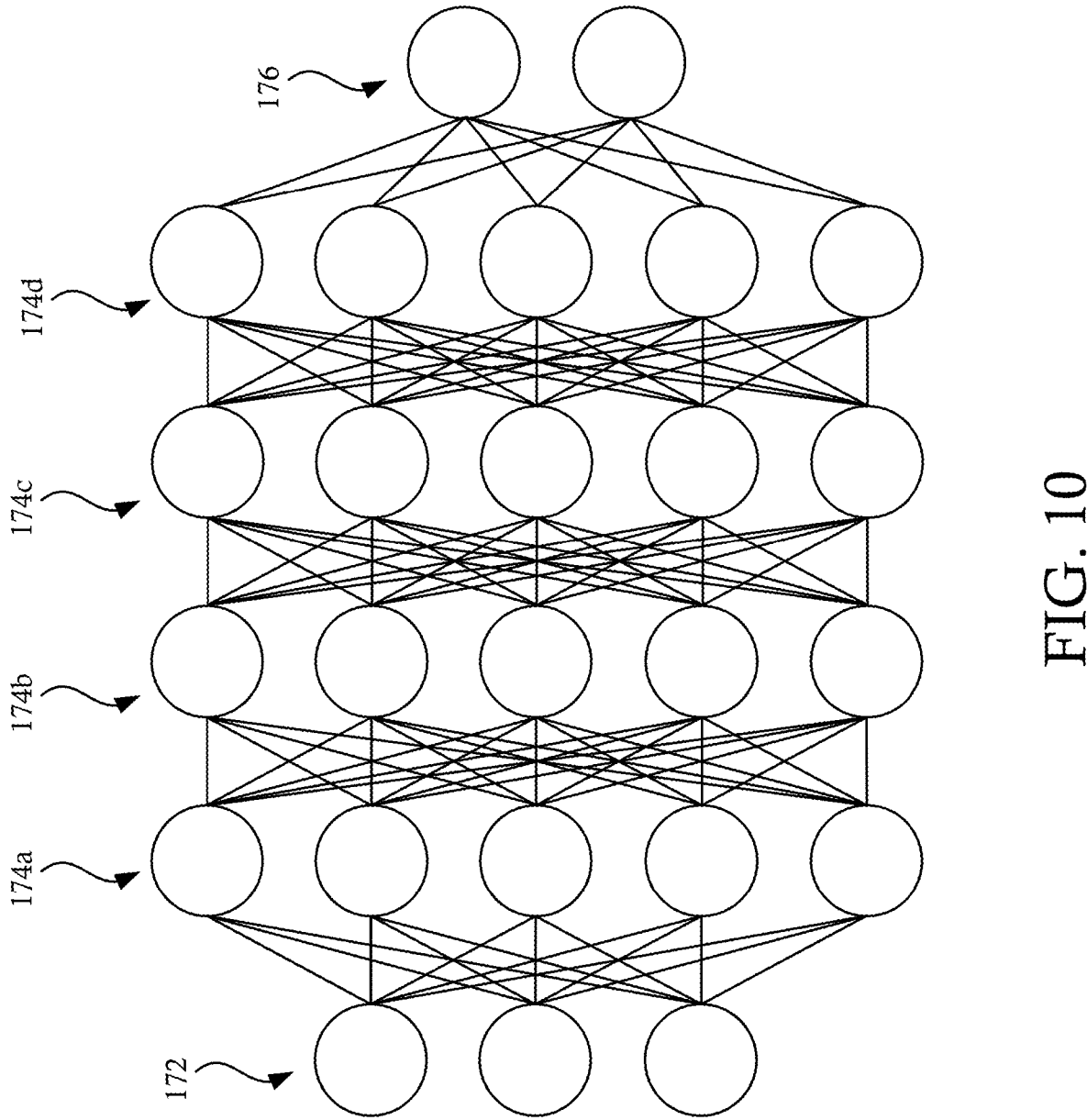
FIG. 10 illustrates a deep neural network (DNN), in accordance with some embodiments.

FIG. 10 illustrates a deep neural network (DNN) 170, in accordance with some embodiments. The DNN 170 is an artificial neural network, such as the neural network 100 illustrated in conjunction with FIG. 8, that includes representation learning. The DNN 170 may include an unbounded number of (e.g., two or more) intermediate layers 174a-174d each of a bounded size (e.g., having a predetermined number of nodes), providing for practical application and optimized implementation of a universal classifier. Each of the layers 174a-174d may be heterogenous. The DNN 170 may be configured to model complex, non-linear relationships. Intermediate layers, such as intermediate layer 174c, may provide compositions of features from lower layers, such as layers 174a, 174b, providing for modeling of complex data.

In some embodiments, the DNN 170 may be considered a stacked neural network including multiple layers each configured to execute one or more computations. The computation for a network with L hidden layers may be denoted as equation 5 in FIG. 13A, where $a^{(l)}(x)$ is a preactivation function and $h^{(l)}(x)$ is a hidden-layer activation function providing the output of each hidden layer. The preactivation function $a^{(l)}(x)$ may include a linear operation with matrix $W^{(l)}$ and bias $b^{(l)}$, per equation 6 in FIG. 13A.

In some embodiments, the DNN 170 is a feedforward network in which data flows from an input layer 172 to an output layer 176 without looping back through any layers. In some embodiments, the DNN 170 may include a backpropagation network in which the output of at least one hidden layer is provided, e.g., propagated, to a prior hidden layer. The DNN 170 may include any suitable neural network, such as a self-organizing neural network, a recurrent neural network, a convolutional neural network, a modular neural network, and/or any other suitable neural network.

In some embodiments, a DNN 170 may include a neural additive model (NAM). An NAM includes a linear combination of networks, each of which attends to (e.g., provides a calculation regarding) a single input feature. For example, a NAM may be represented as equation 7 in FIG. 13A, where $\beta$ is an offset and each $f_i$ is parametrized by a neural network. In some embodiments, the DNN 170 may include a neural multiplicative model (NMM), including a multiplicative form for the NAM mode using a log transformation of the dependent variable y and the independent variable x, as illustrated in equation 8 in FIG. 13A, where d represents one or more features of the independent variable x.

Identification of discrepancies between physical display units and planogram data can be burdensome and time consuming for users, especially if manual comparisons must be made to each individual physical display unit and corresponding item. Typically, a user MUST perform multiple manual steps to determine deviations between planogram data and actual physical deployments on physical displays. Systems configured to automatically identify deviations between image data and planogram data, as disclosed herein, significantly reduce this problem, allowing users to quickly identify discrepancies, metrics, and trends with fewer, or in some case no, active steps. For example, in some embodiments described herein, when a user is presented with a user interface, each interface includes automatically generated comparisons between remotely captured image data and planogram data and further includes automatically generated metrics, insights, and/or recommendations related to the comparison.

It will be appreciated that comparisons between image data and planogram data, as disclosed herein, particularly on large datasets intended to be used large catalogs of items, is only possible with the aid of computer-assisted machine-learning algorithms and techniques, such as image processing and natural language generation techniques. In some embodiments, machine learning processes including image processing and/or NLG models are used to perform operations that cannot practically be performed by a human, either mentally or with assistance, such as a comparison between image data and planogram data, automatic generation of metrics, and/or conversion of machine-interpretable insights and recommendations to human interpretable insights and recommendations.

Although the subject matter has been described in terms of exemplary embodiments, it is not limited thereto. Rather, the appended claims should be construed broadly, to include other variants and embodiments, which may be made by those skilled in the art.

What is claimed is:

1. A system, comprising:
a non-transitory memory;
a processor communicatively coupled to the non-transitory memory, wherein the processor is configured to read a set of instructions to:
obtain image data of at least one physical display unit;
annotate, by an image processing engine executing one or more machine learning models, the image data to identify at least one item within the image data;
obtain planogram data of a planogram corresponding to the at least one physical display unit;
compare the at least one item within the image data to an expected aspect of the at least one item within the planogram data;
generate, by a natural language engine executing an isolation forest model, at least one text-based insight by converting a machine-readable insight generated based on the comparison between the at least one item within the image data and the expected aspect of the at least one item within the planogram data;
generate a user interface including the image data and the at least one text-based insight, the user interface comprising a carousel container and a metric display portion, the carousel container configured to display at least two representations of planogram data and a plurality of graphical representations, each graphical representation corresponding to either planogram data for a specific physical display unit or image data for a specific physical display unit; and
display, in the user interface and in response to a user selection of a graphical representation of planogram data from the carousel container, (i) image data associated with a corresponding physical display unit, (ii) at least one interface indicator overlapping the at least one item in the image data, and, in the metric display portion (iii) one or more comparison metrics between the image data and the planogram data for the corresponding physical display unit.

2. The system of claim 1, wherein the image data is annotated to identify a position of the at least one item within the image data.

3. The system of claim 1, wherein the processor is configured to read the set of instructions to generate at least one comparison metric representative of the comparison between the at least one item within the image data and the expected aspect of the at least one item within the planogram data.

4. The system of claim 3, wherein the user interface includes a graphical representation of the at least one comparison metric.

5. The system of claim 1, wherein the at least one comparison metric comprises at least two comparison metrics, and wherein the processor is configured to read the set of instructions to generate an aggregated comparison metric based on a combination of the at least two comparison metrics.

6. The system of claim 1, wherein the image processing engine executes one or more object identification and annotation models to annotate the image data with locations including spatial coordinates identifying areas including regions or bounding boxes, occupied by the at least one item.

7. The system of claim 1, wherein the expected aspect comprises at least one of: a target shelf position within a defined shelf segment and an expected quantity for the at least one item, and wherein the comparison determines a deviation in position and a deviation from the expected quantity.

8. The system of claim 1, wherein the user interface displays the at least one interface indicator as a visible overlay whose graphical aspect is selected based on a discrepancy category or comparison metric determined from the comparison, and wherein the natural language engine includes, in the at least one text-based insight, a description of the discrepancy category.

9. A computer-implemented method, comprising:
obtaining image data of at least one physical display unit;
annotating, by an image processing engine, the image data to identify at least one item within the image data;
obtaining planogram data of a planogram corresponding to the at least one physical display unit;
comparing the at least one item within the image data to an expected aspect of the at least one item within the planogram data;
generating, by a natural language engine executing at least one machine learning model, at least one text-based insight by converting a machine-readable insight generated based on the comparison between the at least one item within the image data and the expected aspect of the at least one item within the planogram data;
generating a user interface including the image data and the at least one text-based insight, the user interface comprising a carousel container and a metric display portion, the carousel container configured to display at least two representations of planogram data and a plurality of graphical representations, each graphical representation corresponding to either planogram data for a specific physical display unit or image data for a specific physical display unit; and displaying, in the user interface and in response to a user selection of a graphical representation of planogram data from the carousel container, (i) image data associated with a corresponding physical display unit, (ii) at least one interface indicator overlapping the at least one item in the image data, and, in the metric display portion (iii) one or more comparison metrics between the image data and the planogram data for the corresponding physical display unit.

10. The computer-implemented method of claim 9, wherein the image data is annotated to identify a position of the at least one item within the image data.

11. The computer-implemented method of claim 9, comprising generating at least one comparison metric representative of the comparison between the at least one item within the image data and the expected aspect of the at least one item within the planogram data.

12. The computer-implemented method of claim 11, wherein the user interface includes a graphical representation of the at least one comparison metric.

13. The computer-implemented method of claim 9, wherein the at least one comparison metric comprises at least two comparison metrics, and wherein the computer-implemented method comprises generating an aggregated comparison metric based on a combination of the at least two comparison metrics.

14. The computer-implemented method of claim 9, wherein the at least one machine learning model executed by the natural language engine comprises an isolation forest model.

15. The method of claim 9, wherein the expected aspect comprises at least one of: a target shelf position within a defined shelf segment and an expected quantity for the at least one item, and wherein the comparison determines a deviation in position and a deviation from the expected quantity.

16. The method of claim 9, wherein the user interface displays the at least one interface indicator as a visible overlay whose graphical aspect is selected based on a discrepancy category or comparison metric determined from the comparison, and wherein the natural language engine includes, in the at least one text-based insight, a description of the discrepancy category.

17. A non-transitory computer readable medium having instructions stored thereon, wherein the instructions, when executed by at least one processor, cause at least one device to perform operations comprising:

obtaining image data of at least one physical display unit;

annotating, by an image processing engine executing a plurality of artificial intelligence models, the image data to identify at least one item within the image data;

obtaining planogram data of a planogram corresponding to the at least one physical display unit;

comparing the at least one item within the image data to an expected aspect of the at least one item within the planogram data;

generating, by a natural language engine executing at least one machine learning model, at least one text-based insight by converting a machine-readable insight generated based on the comparison between the at least one item within the image data and the expected aspect of the at least one item within the planogram data;

generating a user interface including the image data and the at least one text-based insight, the user interface comprising a carousel container and a metric display portion, the carousel container configured to display at least two representations of planogram data and a plurality of graphical representations, each graphical representation corresponding to either planogram data for a specific physical display unit or image data for a specific physical display unit; and displaying, in the user interface and in response to a user selection of a graphical representation of planogram data from the carousel container, (i) image data associated with a corresponding physical display unit, (ii) at least one interface indicator overlapping the at least one item in the image data, and, in the metric display portion (iii) one or more comparison metrics between the image data and the planogram data for the corresponding physical display unit.

18. The non-transitory computer readable medium of claim 17, wherein the image data is annotated to identify a position of the at least one item within the image data.

19. The non-transitory computer readable medium of claim 17, wherein the instructions cause the at least one device to perform operations comprising generating at least one comparison metric representative of the comparison between the at least one item within the image data and the expected aspect of the at least one item within the planogram data, and wherein the user interface includes a graphical representation of the at least one comparison metric.

20. The non-transitory computer readable medium of claim 17, wherein the at least one comparison metric comprises at least two comparison metrics, and wherein the instructions cause the at least one device to perform operations comprising generating an aggregated comparison metric based on a combination of the at least two comparison metrics.

* * * * *